Patented Nov. 15, 1949

2,487,805

UNITED STATES PATENT OFFICE 2,487,805

SELECTIVE SORPTION PROCESS

Donald A. Hermanson, Plainfield, N. J., assignor to Socony-Vacuum Oil Company, Incorporated, a corporation of New York No Drawing. Application February 7, 1948,
Serial No. 6,992

14 Claims. (Cl. 196—147)

This invention relates to a selective sorption process and, more particularly, is concerned with a method for separating liquid mixtures having two or more components of differing molecular volume by contacting the same with a solid, porous sorbent particle form material under conditions permitting a separation between the comparatively lower molecular volume and higher molecular volume components of said mixture by sorption of the former into the pores of the contact material while the latter remain unsorbed.

The problem of separating mixtures and materials is encountered in a large number of instances throughout the process industries, and methods used in effecting the separation are widely varied, depending mainly on the properties of the materials being separated. Commonly employed methods involving separation of materials have included distillation, solvent extraction, filtration, dialysis, and the like. In spite of the numerous ways of separating mixtures of various materials, it is a recognized fact that no one method is applicable to all separations and that many combinations of materials are difficult to separate by any known means.

In accordance with the present invention, a new method for separating non-gaseous liquid-containing mixtures has been found. This method comprises bringing the mixture to be treated in contact with particles of a porous sorbent medium under such conditions of contact that the less viscous, low molecular volume components of the mixture are sorbed, leaving the more viscous, high molecular volume components unsorbed, thus effecting a separation of the mixture into two fractions.

The process of this invention may be employed in separating non-gaseous complex mixtures containing at least one liquid component whenever two or more of the components comprising said mixture differ in molecular volume. The process of this invention may thus be used in separating the components of animal, vegetable, marine, and mineral oils, waxes, resins, and similar mixtures. The selective sorption method described herein is particularly adaptable for the separation of hydrocarbon mixtures, such as those found in petroleum, into fractions having a low viscosity-high viscosity index and light color in comparison to the oil charge being treated and other fractions having a higher viscosity and a darker color than the original oil.

It has been found that porous contact materials having a structure corresponding to that of an inorganic oxide gel having a substantially uniform porosity of low macropore volume with an average pore diameter not exceeding about 125 Angstrom units and a particle size preferably not smaller than about 30 mesh for most operations have the ability to sorb the light components of a liquid hydrocarbon fraction, while leaving substantially unsorbed the darker, more viscous components. In this respect, the process of the present invention is to be distinguished from the decolorizing of petroleum oil by contacting the same with clay, bauxite, and similar materials, whereby the dark, heavier components of the oil are removed, leaving behind the lighter components. It will thus be seen that the action of these latter adsorbents is the reverse of that encountered in the selective sorption process described herein.

The macropore volume of the contact material employed in the present invention should be relatively low so that the pore volume is substantially that of micropores. In general, the volume of macropores, that is, those pores having radii larger than 100 Angstrom units, should constitute less than about 30 per cent of the total pore volume, and preferably 10 per cent or less. The measurement of pore size and pore size distribution in various porous materials is discussed in detail by L. C. Drake and H. L. Ritter in Industrial and Engineering Chemistry, Analytical Edition, volume 17, pages 782–791 (1945). The methods described there were essentially those employed in determining the bulk densities, average pore diameters, and other pore measurements of the absorbents employed in the present invention.

The size of the sorbent particles employed in the process of this invention is to some extent dependent upon the variables involved in any particular application of the process. These important variables are: time of contact between the liquid mixture under treatment and the sorbent in the sorption zone, temperature in the sorption zone, viscosity of the liquid charge, and, to a lesser extent, the ratio of liquid mixture to sorbent charged to the sorption zone. Increasing time of contact results in a decrease in the efficiency of the desired separation. Decreasing viscosity of the liquid charge has the same effect. On the other hand, increasing temperature and decreasing viscosity both result in more rapid sorption of the lighter, less viscous components of the mixture. If the ratio of sorbent to liquid charge is excessive, some loss in separation efficiency results. By proper control of these variables, some latitude in the average diameter of the sorbent employed may be provided. However, when the diameter of the particles becomes too small, the sorbent preferentially sorbs the heavier, more viscous components from the charge mixture in the same manner as well known decolorizing clays. This is shown in Table I below, in which is tabulated the results obtained upon separation of a mid-continent residuum using a silica-alumina gel type sorbent having a bulk density in the 4–8 mesh size range of about 0.7.

by limiting the sorbents within the range of 0.03 to 0.20 inch average diameter and of reasonably uniform size. It is pointed out, however, that by proper control of the variables discussed hereinabove and also of the average pore diameter of the sorbent, operation according to the method of this invention may be obtained on sorbent particles outside the size ranges given, although the results will be less satisfactory. It is contemplated that, in its broader aspects, this invention covers these latter operations as well as

*Table I*

| Experiment Number | 1 | 4 | 5 | 6 | 7 | 2 | 3 |
|---|---|---|---|---|---|---|---|
| Charge Viscosity, S. U. V | 116.9 | 116.9 | 81.9 | 81.9 | 81.9 | 81.8 | 340 |
| Charge Ramsbottom Carbon | | | 2.3 | 2.3 | 2.3 | 2.3 | 5.1 |
| Mesh Size of Sorbent (Tyler) | 4–8 | 30–60 | 30–60 | 60–80 | 30–60 | 4–8 | 4–8 |
| Sorption Zone Contact Time | 24 hrs. | 24 hrs. | 2 min. | 2 min. | 2 hrs. | 72 hrs. | 4 hrs. |
| Sorption Zone Temperature, °F | 150 | 150 | 150 | 150 | 150 | 75 | 275 |
| Weight Ratio of Sorbent to Liquid Charge | 1 | 1 | 1 | 1 | 1 | 1 | 2.2 |
| Properties of Oily Constituent Retained by sorbent: | | | | | | | |
| S. U. V. at 210° F. sec | 69.7 | 129.2 | 75.1 | 81.9 | 115.7 | 49.7 | 151 |
| Ramsbottom Carbon, per cent | | | 1.8 | 2.3 | 3.1 | | 2.4 |
| Properties of Materials Washed from Sorbent Surface: | | | | | | | |
| S. U. V. at 210° F. sec | 164 | 100.1 | 86.4 | 80.5 | 76.0 | 139.2 | 650 |
| Ramsbottom Carbon, Per cent | | | 2.4 | 2.2 | 2.0 | 3.5 | 6.7 |

It will be apparent from the above Table I that when the gel type particles were greater than 30 mesh size, even at relatively high temperatures and long contact periods, the oily constituents of low viscosity and carbon residue were sorbed in the pores of the sorbent, while the more viscous, heavier constituents could be washed away with a suitable washing solvent, in this case benzol. On the other hand, in the case of sorbent particles ranging from 30 to 60 mesh size, when the contact period was 24 hours (experiment 4) or even 2 hours (experiment 7), the sorbent acted similar to a normal filtering clay and preferentially sorbed the heavier, more viscous constituents, but when the contact time was reduced to 2 minutes (experiment 5), the 30–60 mesh sorbent exhibited a preference for the lighter, less viscous constituents over the heavier, more viscous constituents. When the particle size was reduced below 60 mesh, the sorbent preferentially sorbed the heavier, viscous constituents, even at very low contact periods (experiment 6).

The effect of contact time and temperature is shown in Table II below, in which are tabulated the results obtained upon separation of an East Texas residuum having an original Saybolt Universal viscosity of 512 seconds at 210° F. and a Ramsbottom carbon residue of 11.1. In this experiment, a silica-alumina gel type sorbent of 4–8 mesh size and 0.48 bulk density was employed.

*Table II*

| Experiment Number | 1 | 2 | 3 |
|---|---|---|---|
| Sorption Zone Contact Time, Hrs | 4 | 4 | 2 |
| Sorption Zone Contact Temp., °F | 275 | 300 | 300 |
| Sorbent to Oil Weight Ratio | 1.6 | 1.4 | 1.5 |
| Ramsbottom Carbon Residue, Per Cent of sorbed oily constituents | 1.9 | 2.6 | 2.0 |

In general, it may be said that the particle size of the sorbent material, particularly in the case of inorganic oxide gel type sorbents, should be not less than about 60 mesh Tyler and preferably within the range of about 0.022 to 1.0 inch average diameter. The best results may be obtained the operations within the specified preferred limits.

The porosity of the gel particles employed in the process of this invention is of fundamental importance. The degree of porosity is generally reflected in the bulk density of the gel composite used; the lower the bulk density, the greater being the degree of porosity. For the purposes of the present process, porous sorbent particles having bulk densities of between about 0.4 and 1.1 grams per cubic centimeter are preferred. The bulk densities indicated correspond to an average pore diameter of between about 20 and about 125 Angstrom units. Preferably, the sorbent used will have a bulk density between about 0.6 and about 0.8 gram per cubic centimeter. Gel particles having a bulk density greater than about 0.8 have been found to have excellent selectivity but poor sorbing capacity, while particles with a bulk density less than about 0.6 have relatively poor selectivity. However, since the selectivity of the separation process improves with a decrease in temperature, particles with a bulk density of less than 0.6 would be satisfactory for treating stocks which can be processed at low temperatures.

The degree of porosity of a synthetic inorganic oxide gel will, in general, depend on the conditions under which it is prepared and allowed to set to gelation. A particularly convenient method of preparing gel particles used in the process of this invention is described in U. S. Patent 2,384,946, issued September 18, 1945, to Milton M. Marisic. It is there disclosed that spheroidal particles of inorganic oxide gel may be prepared by mixing an acidic stream with a stream of sodium silicate and allowing the resulting sol to be ejected from a nozzle into an oil column, where the gel sets in the form of bead-like spheroids. The resulting gel spheres, after washing, drying and tempering, were of a size varying between about 4 and about 20 mesh. The gel beads so produced had a bulk density of between about 0.4 and about 1.1 and an average pore diameter of between about 20 and about 125 Angstrom units. They proved to be excellent selective absorbents for use in the process of this invention.

Likewise, irregularly shaped porous absorbent fragments or particles having the structure of inorganic oxide gels may be used. However, in general, spheroidal particles are to be preferred, since attrition losses are then at a minimum and contamination with gel fines of the stock being treated is substantially eliminated.

In general, inorganic oxide gel particles such as those of silica, zirconia, alumina, beryllia, thoria, and the like, will be used in the process of this invention. Of this group, the siliceous gel particles containing silica either alone or in combination with one or more other inorganic metal oxides are preferred. Thus, particles of silica-alumina gel, silica-zirconia gel, silica-thoria gel, and the like, are excellent sorbents for use in the present process. Porous sorptive silica glasses having a structure approaching that of a siliceous gel likewise are contemplated for use in the process described herein, it being necessary, however, that the porous glasses employed have an average pore diameter less than about 125 Angstrom units, and a macropore volume of less than about 30 per cent of the total pore volume. The size of the porous glass particles must also be carefully controlled so as to obtain preferential sorption of the lighter, less viscous constituents of the mixture. Usually, particles of less than 60 mesh size are undesirable. It is also contemplated that, within the scope of this invention, other porous materials not of siliceous gel composition which have structures approaching that of an inorganic oxide gel and are within the above specified pore size and particle size may be employed in the selective sorption process of this invention.

Typical of the porous glasses used are those described in U. S. Patent 2,106,744, issued February 1, 1938, to Hood et al. There it is disclosed that a silica-alkali-boric oxide glass of suitable composition is prepared by a fusion process. Heat treatment of this glass results in separation of the glass into two phases; one phase is rich in alkali-boric oxide and is soluble in acids, while the other phase, which is insoluble in acid, consists of silica with a small amount of boric oxide. Extraction of this heat treated glass with acid results in a porous silica glass which can be employed as a porous absorbent separating medium in accordance with the present invention.

The process of this invention is accordingly carried out by bringing a non-gaseous mixture containing components of differing molecular volume in contact with a particle-form porous medium having a structure of an inorganic oxide gel and thereafter separating the material which was not sorbed from the porous particles containing sorbed material. The contacting is carried out in any suitable vessel where direct contact between particles of sorbent and the mixture to be separated is effected. The porous particles sorb the lower molecular volume components present in the mixture as liquids, while the higher molecular volume components remain unsorbed.

The temperature at which the contacting step is conducted may vary over wide limits, depending to a large extent on the nature of the mixture undergoing treatment. The minimum usable temperature is, in general, the lowest temperature at which the liquid component of lowest freezing point will flow. The maximum temperature at which the selective sorption process can be carried out is usually governed by the viscosity of the mixture being treated. The sorption becomes less selective as the viscosity of the mixture decreases. Thus, where the mixture being separated is a mineral oil fraction, the lowest temperature usable is that at which the oil will flow and the maximum temperature will be dependent on the viscosity of the fraction being separated. For a distillate stock, the maximum temperature may be below room temperature, while a heavy residual stock can be selectively separated at temperatures as high as about 350° F.

The time required for the selective sorption process to take place depends upon the degree of separation desired and also upon the conditions of the contact, such as the viscosity of the mixture being treated, temperature, and the like. In general, saturation of the sorbent particles with the liquid mixture is not required and excessive contact time is to be avoided since it has generally been found to reduce the selectivity of the operation.

The weight ratio of sorbent to mixture undergoing treatment may vary over wide limits but will generally be between about 0.1 to 1 and about 20 to 1. When the process of this invention is employed in separating a mineral oil fraction, the weight ratio of sorbent to oil will generally be between 0.5 and 3. With a weight ratio lower than that indicated, the sorbed fraction will generally be very small in proportion to the unsorbed fraction. The higher ratios will usually be employed with the sorbents of higher density whose sorbing capacity is smaller. An approximately equal weight mixture of oil and sorbent has been found to be particularly effective under the usual operation conditions.

The subsequent removal of unsorbed material from the porous sorbent particles may be accomplished by one of a number of methods, depending on the type of material contacted. If both the high and low molecular volume components of the mixture undergoing separation are liquids, the unsorbed material is allowed to drain or may be centrifuged. A certain amount of unsorbed material adheres to the surface of the contact particles and this is removed by washing with a suitable solvent. If the unsorbed material is a solid, separation may be accomplished by screening, solvent-washing, use of air currents to lift the lighter material, or other suitable methods.

The components sorbed by the particles of porous contact material may be recovered by solvent extraction or, if it is not desired to utilize this sorbed component, removal by burning may be used. The sorbent particles employed are regenerated by this solvent extraction or burning and may be re-used a large number of times before requiring replacement with fresh sorbent.

The separation process described herein may be carried out either in batch operation or as a continuous process by adding a suitable quantity of the above described sorbent particles to the material being treated or percolating the mixture to be separated through a bed of the porous sorbent.

The following detailed examples will serve to illustrate the process of this invention without limiting the same.

EXAMPLE 1

A silica-alumina hydrosol was prepared by mixing 1.00 volume of a solution of sodium silicate containing 157.0 grams of SiO₂ per liter with 1.00 volume of a solution containing 39.79 grams of aluminum sulfate and 30.51 grams of sulfuric acid per liter. The resulting colloidal solution was ejected from a nozzle in the form of globules into a column of gas oil whose depth was about eight feet. The globules of solution fell through the oil and gelled before passing into a layer of water located beneath the oil. The time of gelation for the concentrations and proportions of reactants given was about 4 seconds. The spherical particles of gel were conducted out of the bottom of the column into a stream of water and, on removal from the water, base exchanged with an aqueous solution of aluminum sulfate and water-washed. The globules were then slowly and uniformly dried in superheated steam at about 300° F. until shrinkage was substantially complete and the drying was continued at a gradually increasing temperature up to about 1050° F., which temperature was maintained for 0.5 hour. The silica-alumina gel resulting retained its spheroidal shape during the washing and drying operations and had a final particle size of about 4–20 mesh. The bulk density of particles so obtained was between about 0.4 and 1.1 grams per cubic centimeter and the average pore diameter was between about 20 and about 125 Angstrom units.

A sample of mineral oil having a Saybolt Universal viscosity of 125 seconds at 210° F., prepared by solvent-treating a Mid-Continent residue, was contacted with an equal weight of the above prepared gel particles for 20 hours at 75° F. The oil not taken up by the particles was filtered off (unsorbed oil). The oil adhering to the outer surface of the particles was washed off with a solvent and recovered (wash). The oil sorbed in the gel pores was extracted with a solvent mixture containing 50–60 per cent benzene, 38–45 per cent methyl-ethyl ketone and 5–10 per cent toluene and recovered. The following properties were observed in the charge stock and the materials recovered from the operation:

|  | Charge Stock | Unsorbed Oil | Wash | Extract |
|---|---|---|---|---|
| Yield, per cent (wt.) | 100 | 50.8 | 21.4 | 25.6 |
| S. U. V. at 210° F. | 125.4 | 154.2 | 151.5 | 88.0 |
| Color (Lovibond) | 135 | 170 | 170 | 40 |

The particles of gel sorbent recovered from this operation were used to repeat the separation on a fresh portion of oil and the following tests were observed:

|  | Charge Stock | Unsorbed Oil | Wash | Extract |
|---|---|---|---|---|
| Yield, per cent (wt.) | 100 | 45.4 | 27.2 | 25.6 |
| S. U. V. at 210° F. | 125.4 | 150.6 | 146.5 | 82.9 |
| Color (Lovibond) | 135 | 170 | 175 | 30 |

From the above, it will be seen that hydrocarbon components of small enough molecular volume to penetrate into the gel pores were recovered in the extract, while compounds not sorbed under the above conditions remained outside and were filtered off. This gives rise to the high viscosity of the oil filtered off and the low viscosity of the oil removed from inside the gel particles.

EXAMPLE 2

A sample of 300 grams of a 5 per cent solution of paratone in kerosene was contacted with 500 grams of gel particles, prepared as described in Example 1, for 24 hours at 75° F. The material not taken up by the sorbent particles was filtered off (unsorbed components). The material adhering to the outer surface of the beads was washed off with kerosene (wash). The material sorbed in the pores of the gel was extracted with a solvent mixture containing 50–60 per cent benzene, 38–45 per cent methyl-ethyl ketone and 5–10 per cent toluene and recovered (extract). The following properties were observed on the charge stock and the materials recovered from the operation:

|  | Charge Stock | Unsorbed Oil | Wash | Extract |
|---|---|---|---|---|
| Kinematic Viscosity at 100° F. | 7.65 | 30.05 | 3.47 | 2.21 |
| Per cent Paratone | 5.0 | 11.1 | 1.8 | |

In this instance, kerosene entered the gel pores while paratone, a paraffin polymer of high molecular volume, remained outside the gel particles.

EXAMPLE 3

A sample of solvent refined Mid-Continent residuum was contacted with an equal weight of a porous glass prepared according to the procedure described in U. S. Patent 2,106,744, and characterized by a bulk density of 0.844 gram per cubic centimeter and an average pore diameter of 35 Angstrom units.

After remaining in contact for 20 hours at 150° F., the oil not taken up by the porous glass particles was filtered off (unsorbed oil). The oil adhering to the outer surface of the particles was washed off with a solvent and recovered (wash). The oil sorbed in the glass pores was extracted with a mixture of equal volumes of benzene and methyl-ethyl ketone and recovered. The following properties were observed in the charge stock and materials recovered from the operation:

|  | Charge Stock | Unsorbed Oil | Wash | Extract |
|---|---|---|---|---|
| Yield, per cent (wt.) | 100 | 49.7 | 34.5 | 10.3 |
| S. U. V. at 210° F. | 110.1 | 114.7 | 114.4 | 87.1 |
| Color (Lovibond) | 225 | 240 | 315 | 175 |

EXAMPLE 4

A sample of mineral oil having a Saybolt Universal viscosity of 108.1 seconds at 210° F., prepared by solvent-treating a Mid-Continent residue, was contacted with an equal weight of silica gel particles of 8–20 mesh, having a bulk density of 0.750 and a percentage macropore volume of about 1.1 for 44 hours at 150° F. The oil sorbed in the gel pores was recovered by solvent extraction with a mixture of equal volumes of benzene and methyl-ethyl ketone. The following properties were observed in the oil before and after sorption:

|  | Yield, Per Cent Wt. | S. U. V. at 210° F. | Viscosity Index | Color (Lovibond) |
|---|---|---|---|---|
| Oil before Sorption | 100 | 108.1 | 103 | 155 |
| Oil Sorbed | 6.6 | 53.2 | 117 | 10 |

EXAMPLE 5

A sample of the mineral oil employed in Example 4 was contacted with an equal weight of two different samples of silica-alumina spheroidal gel particles, prepared as described in Example 1, having a bulk density of 0.825 and 1.018, respectively. The oil and sorbent remained in contact for 44 hours at 150° F. The unsorbed oil was drained from the particles, which were then washed to remove adhering oil on the surface. The oil sorbed in the gel pores was removed by solvent extraction with a mixture of equal volumes of benzene and methyl-ethyl ketone. The properties of the oil before sorption and the sorbed oil were observed and are recorded below:

|  | Bulk Density of Sorbent | Yield, Per Cent Wt. | S. U. V. at 210° F. | Viscosity Index | Color (Lovibond) |
|---|---|---|---|---|---|
| Oil before Sorption | | 100 | 108.1 | 103 | 155 |
| Oil Sorbed | 0.825 | 21.1 | 58.3 | 112 | 7 |
| | 1.018 | 3.1 | 54.3 | 118 | 24 |

The effect of bulk density of the sorbent on the selective sorption process is shown further in the table below. Sorbent particles prepared by a process similar to that described in Example 1 were contacted with a refined mineral oil in equal weights for a period of 44 hours at a temperature of 150° F. and then treated as in the previous examples. The bulk densities of the sorbent, the relative selectivity of separation process, and the viscosity of the separated oil fractions are shown.

| Example | Bulk Density | Yields, Per Cent wt. | | | S. U. V. at 210° F., seconds | | | |
|---|---|---|---|---|---|---|---|---|
| | | Sorbed Oil | Wash | Unsorbed Oil | Charge | Sorbed Oil | Wash | Unsorbed Oil |
| 5 | 0.518 | 68.7 | 29.5 | 0 | 108.1 | 104.6 | 110.6 | |
| 6 | 0.597 | 49.7 | 31.9 | 16.1 | 108.1 | 93.9 | 129.5 | 126.8 |
| 7 | 0.685 | 41.7 | 14.7 | 40.0 | 108.1 | 87.0 | 138.7 | 136.5 |
| 8 | 0.825 | 21.1 | 22.0 | 56.4 | 108.1 | 58.3 | 137.9 | 138.4 |
| 9 | 0.876 | 15.9 | 17.4 | 64.9 | 108.1 | 60.3 | 124.6 | 127.3 |
| 10 | 0.994 | 6.3 | 18.4 | 75.3 | 108.1 | | 108.0 | 115.8 |
| 11 | 1.018 | 3.1 | 10.7 | 83.9 | 108.1 | 54.3 | 112.4 | 116.2 |
| 12 | 1.064 | 3.1 | 18.7 | 75.0 | 108.1 | 65.3 | 111.7 | 112.3 |
| 13 | 1.077 | 2.2 | 12.2 | 87.2 | 108.1 | | 111.5 | 111.9 |

From the above examples, it will be apparent to those skilled in the art that a porous particle-form contact material having the structure of an inorganic oxide gel of suitable particle and pore size can be employed as a selective sorbent in separating mixtures having components of differing molecular volume by sorption of the lighter, smaller molecular volume components into the pores of the contact material, while the heavier, larger molecular volume components remain unsorbed.

It is to be understood that the pore size distribution of pores and the particle size of the sorbent medium employed are of fundamental importance to the selective sorption process under the particular condition of time and temperature of contact employed. Porous contact materials having a structure corresponding to that of an inorganic oxide gel having a substantially uniform porosity of low macropore volume with an average pore diameter not exceeding about 125 Angstrom units function as excellent sorbents in the present process. It should be noted that clay and various pelleted or extruded, synthetic siliceous composites, such as those employed in the cracking of petroleum hydrocarbons, are not effective sorbents for use in the present selective separation process. These materials contain, in addition to the small pores present in the gel structure, relatively large voids having pore diameters of 1000–10,000 Angstrom units and larger, which render the material ineffective for use as a sorbent in the present invention.

This application is a continuation-in-part of co-pending application Serial Number 655,581, filed March 19, 1946, and now abandoned.

I claim:

1. A process for treating a liquid mixture having components of differing molecular volume, which comprises contacting said mixture with a porous particle-form sorbent material in which the pores are mostly micropores and the volume of pores having radii greater than about 100 Angstrom units is less than about 30 per cent of the total pore volume, controlling the contact time, the temperature, and the relative amounts of mixture and sorbent to effect sorption of the lower molecular volume components into the pores of said sorbent, while leaving substantially unsorbed the larger molecular volume components, thereby effecting a separation of the mixture into two fractions.

2. A process for treating a liquid mixture having components of differing molecular volume, which comprises sorbing the lower molecular volume components of said mixture into the pores of a substantially microporous particle-form sorbent contact material, the particles of which are greater than about 60 mesh size and in volume is occupied by pores having radii greater than about 100 Angstrom units, while leaving substantially unsorbed the higher molecular volume components, thereby effecting a separation of said mixture into two fractions.

3. A process for treating a liquid mixture of hydrocarbons having components of differing molecular volume, which comprises contacting said mixture with a porous particle-form contact material in which most of the pores are micropores and the volume of pores having radii greater than about 100 Angstrom units is less than about 30 per cent of the total pore volume and in which the particles are greater than about 30 mesh size to effect sorption of the lower molecular volume components of said mixture into the pores of said contact material, while the higher molecular volume components of said mixture remain substantially unsorbed, thereby effecting a separation of the mixture into two fractions.

4. A process for treating a liquid mixture of hydrocarbons having components of differing molecular volume, which comprises contacting said mixture with a porous particle-form inorganic oxide gel contact material in which most of the pores are micropores and the volume of pores having radii greater than about 100 Angstrom units is less than about 30 per cent of the total pore volume and in which the particles are greater than about 60 mesh size, whereby the lower molecular volume components of said mixture are sorbed into the pores of said contact material, while the higher molecular volume components of said mixture remain substantially unsorbed, thereby effecting a separation of the mixture into two fractions.

5. A process for treating a liquid mixture of hydrocarbons having components of differing molecular volume, which comprises contacting said mixture with a porous particle-form sorbent material in which the pores are mostly micropores and the volume of pores having radii greater than about 100 Angstrom units is less than about 30 per cent of the total pore volume, controlling the contact time, the temperature, and the relative amounts of mixture and sorbent to effect sorption of the lower molecular volume components into the pores of said sorbent, while leaving substantially unsorbed the larger molecular volume components, thereby effecting a separation of the mixture into two fractions.

6. A process for treating a liquid mixture of hydrocarbons having components of differing molecular volume, which comprises contacting said mixture with uniform, substantially microporous siliceous gel particles having a particle size not less than about 60 mesh and in which the volume of pores having radii greater than about 100 Angstrom units is less than about 30 per cent of the total pore volume to effect sorption of the lower molecular volume components of said mixture, while the higher molecular volume components of said mixture remain substantially unsorbed, thereby effecting a separation of the mixture into two fractions.

7. A process for treating a liquid mixture of hydrocarbons having components of differing molecular volume by selective sorption of the lower molecular volume, less viscous components from the higher molecular volume, more viscous components, which comprises contacting said mixture with uniform, substantially microporous inorganic oxide gel particles having a particle size not less than about 30 mesh and a total pore volume made up mostly of micropores, there being less than about 30 per cent of pores having radii greater than about 100 Angstrom units, whereby the low viscosity, low molecular volume components of said mixture are sorbed into the pores of said gel particles, while the high viscosity, high molecular volume components remain unsorbed, thereafter separating said gel particles from said unsorbed components and removing the sorbed components from the pores of said gel particles to thereby effect a separation of the components of said mixture into two fractions, one having a lower viscosity than the original mixture and the other a greater viscosity than the original mixture.

8. A process for treating a mineral oil fraction, which comprises contacting said oil with a particle-form contact material of substantial particle size as distinguished from powdered contact material, said contact material being of a porous structure wherein less than 30 per cent of the total pore volume is occupied by pores of greater than about 100 Angstrom units radius, the remaining pore volume being taken up by smaller pores, controlling the contact time, the temperature, and the relative amounts of oil and contact material to effect sorption of the lower molecular volume components of said oil into the pores of said contact material, while leaving unsorbed the larger molecular volume components, thereby effecting a separation of the oil into two fractions, one fraction comprising the lower molecular volume components and having a viscosity substantially less than that of the original oil and the other fraction comprising the larger molecular volume components and having a viscosity substantially greater than that of the original oil.

9. A process for treating a mineral oil fraction, which comprises bringing said oil into contact with a porous inorganic oxide gel contact material consisting of particles having an average diameter greater than about 0.022 inch and having less than 30 per cent of its pore volume taken up by pores having radii greater than about 100 Angstrom units, the remaining pore volume being taken up by smaller pores, controlling the contact time, the temperature, and the relative amounts of oil and contact material to effect sorption of the lower molecular volume components of said oil into the pores of said contact material, while leaving unsorbed the larger molecular volume components, thereby effecting a separation of the oil into two fractions, one fraction comprising the lower molecular volume components and having a viscosity substantially less than that of the original oil and the other fraction comprising the larger molecular volume components and having a viscosity substantially greater than that of the original oil.

10. A process for separating a mineral oil fraction by selective sorption of the low viscosity, light-colored components from the higher viscosity, dark-colored components, comprising contacting said oil with uniform, substantially microporous inorganic oxide gel particles having less than about 30 per cent of their pore volume taken up by pores of radii greater than about 100 Angstrom units, the remaining pore volume being taken up by smaller pores and having a particle size not less than about 30 mesh to effect sorption of the low viscosity, light-colored components of said oil into the pores of said contact material, while the high viscosity, dark-colored components remain unsorbed, thereafter separating said particles of contact material from said unsorbed components and removing the sorbed components from the pores of said particles to effect a separation of said oil into two fractions, one having a lower viscosity and a lighter color than the original oil and the other having a greater viscosity and a darker color than the original oil.

11. A process for separating a mineral oil fraction by selective sorption of the low viscosity, light-colored components from the higher viscosity, dark-colored components, comprising contacting said oil with uniform, substantially microporous siliceous gel particles having less than about 30 per cent of their pore volume taken up by pores of radii greater than about 100 Angstrom units, the remaining pore volume being taken up by smaller pores and having a particle size not less than about 60 mesh to effect sorption of the low viscosity, light-colored components of said oil into the pores of said particles, while the high viscosity, dark-colored components remain unsorbed, thereafter separating said particles of contact material from the unsorbed components and removing the sorbed components from the pores of said particles to effect a separation of said oil into two fractions, one having a lower viscosity and a lighter color than the original oil and the other a greater viscosity and a darker color than the original oil.

12. A process for treating a petroleum lubricating oil fraction, which comprises contacting said fraction with a porous particle-form sorbent material in which the pores are mostly micropores and the volume of pores having radii greater than about 100 Angstrom units is less than about 30 per cent of the total pore volume, controlling the contact time, the temperature, and the relative amounts of oil and sorbent to effect sorption of the low viscosity, light-colored components of said oil into the pores of said sorbent, while the high viscosity, dark-colored components of said oil remain unsorbed, thereby effecting a separation of the components of said oil into two fractions, one having a lower viscosity and a lighter color than the original oil and the other a greater viscosity and a darker color than the original oil.

13. A process for separating a petroleum lubricating oil fraction by selective sorption of the low viscosity, light-colored components from the higher viscosity, dark-colored components, comprising contacting said oil with uniform, substantially microporous inorganic oxide gel particles having less than about 30 per cent of their pore volume taken up by pores having radii greater than about 100 Angstrom units, the remaining pore volume being taken up by smaller pores and having a particle size not less than about 60 mesh to effect sorption of the low viscosity, light-colored components of said oil into the pores of said gel particles, while the high viscosity dark-colored components remain unsorbed, thereafter separating said gel particles from said unsorbed components and removing the sorbed components from the pores of said gel particles to effect a separation of the components of said oil into two fractions, one having a lower viscosity and a lighter color than the original oil and the other a greater viscosity and a darker color than the original oil.

14. A process for separating a petroleum lubricating oil fraction by selective sorption of the low viscosity, light-colored components from the higher viscosity, dark-colored components, comprising contacting said oil with uniform, substantially microporous inorganic oxide gel particles having a particle size not less than about 60 mesh and in which most of the pores are micropores and the volume of pores having radii greater than about 100 Angstrom units is less than about 30 per cent of the total pore volume to effect sorption of the low viscosity, light-colored components of said oil into the pores of said gel particles, while the high viscosity, dark-colored components remain unsorbed, thereafter separating said gel particles from said unsorbed components, washing said particles with a suitable oil solvent to remove oil adhering to the surface thereof, solvent-extracting the sorbed components from the pores of said gel particles, recovering said sorbed components from the resulting extract to yield a fraction having a lower viscosity and a lighter color than the original oil.

DONALD A. HERMANSON.

REFERENCES CITED

The following references are of record in the file of this patent:

UNITED STATES PATENTS

| Number | Name | Date |
|---|---|---|
| 1,278,023 | Rosenbaum | Sept. 3, 1918 |
| 1,665,264 | Holmes | Apr. 10, 1928 |
| 2,331,353 | Stoewener et al. | Oct. 12, 1943 |
| 2,337,944 | Stoewener et al. | Dec. 28, 1943 |
| 2,384,946 | Marisic | Sept. 18, 1945 |
| 2,422,499 | Pierce et al. | June 17, 1947 |

Certificate of Correction

Patent No. 2,487,805

November 15, 1949

DONALD A. HERMANSON

It is hereby certified that errors appear in the printed specification of the above numbered patent requiring correction as follows:

Column 7, line 11, after the word "given" insert *above*; line 69, for "penerate" read *penetrate*; column 10, line 36, before "volume" insert *which less than 30 per cent of the total pore*;

and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*